US00RE34514E

United States Patent [19]

Wernet et al.

[11] E Patent Number: Re. 34,514

[45] Reissued Date of Patent: Jan. 18, 1994

[54] ELECTRICALLY CONDUCTIVE COMPOSITION OF POLYHETEROAROMATIC COMPOUNDS AND POLYMERIC SULFATES

[75] Inventors: Wolfgang Wernet, Freiburg, Fed. Rep. of Germany; Jean Stoffer, St. Louis, France

[73] Assignee: Ciba-Geigy Corporation, Ardsley, N.Y.

[21] Appl. No.: 876,743

[22] Filed: Apr. 27, 1992

Related U.S. Patent Documents

Reissue of:

[64] Patent No.: 5,061,401
Issued: Oct. 29, 1991
Appl. No.: 401,352
Filed: Aug. 31, 1989

[30] Foreign Application Priority Data

Sep. 9, 1988 [CH] Switzerland ..... 3374/88

[51] Int. Cl.[5] ..... H01B 1/00

[52] U.S. Cl. ..... 252/500; 524/105; 524/84; 524/83; 524/109; 524/111; 525/344; 525/348; 525/326.7; 525/327.5; 525/330.4; 525/333.5; 525/333.9; 525/186; 525/410; 525/411; 525/412; 525/413; 525/417

[58] Field of Search ..... 252/500; 524/105, 84, 524/83, 109, 111; 525/344, 348, 326.7, 327.5, 330.4, 333.5, 333.9, 186, 410, 411, 412, 413, 417

[56] References Cited

U.S. PATENT DOCUMENTS

| | | | |
|---|---|---|---|
| 4,552,927 | 11/1985 | Warren | 525/279 |
| 4,806,271 | 2/1989 | Yaniger | 252/500 |
| 4,869,979 | 9/1989 | Ohtani et al. | 429/191 |
| 4,929,389 | 5/1990 | Aldissi | 252/500 |
| 4,933,106 | 6/1990 | Sakai et al. | 252/500 |
| 5,002,699 | 3/1991 | Jenekhe et al. | 252/500 |
| 5,068,060 | 11/1991 | Jen et al. | 252/500 |
| 5,130,054 | 7/1992 | Jasne | 252/500 |

FOREIGN PATENT DOCUMENTS

| | | |
|---|---|---|
| 0129070 | 12/1984 | European Pat. Off. . |
| 0191726 | 8/1986 | European Pat. Off. . |
| 3402133 | 1/1983 | Fed. Rep. of Germany . |
| 63-135453 | 6/1988 | Japan . |
| 2124635 | 2/1984 | United Kingdom . |

OTHER PUBLICATIONS

Syn. Metals 22 (1987) 145.
J. Polymer Science: P.C.E. 23 (1985) 1687.
Bull. Chem. Soc. Jap. 60 (1987) 3315.
Syn. Metals, 15 (1986) 175.
"Effective Adsorption—Desorption of Cations on a Polypyrrole-Polymer Anion Composite Electrode" by Takeo Shimidzu et al. J. Chem. Soc. Chem. Commun 1415-17 (1986).
Grant & Hackh's Chemical Dictionary, 5th edition (McGraw-Hill) p. 461.

*Primary Examiner*—Christine Skane
*Assistant Examiner*—Bradley A. Swope
*Attorney, Agent, or Firm*—Kevin T. Mansfield; George R. Dohmann

[57] ABSTRACT

A composition comprising (a) at least one oxidized polycationic polyheteroaromatic compound and (b) at least one polyanion of a film-forming thermoplastic polymer containing sulfated alcohol groups

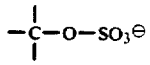

in repeating structural units. The composition has high electrical conductivity and good mechanical properties, especially after drawing at temperatures below the melt/decomposition temperature. The material may be used as electrodes, electrically conductive filaments or components for electromagnetic screening.

19 Claims, No Drawings

ELECTRICALLY CONDUCTIVE COMPOSITION OF POLYHETEROAROMATIC COMPOUNDS AND POLYMERIC SULFATES

Matter enclosed in heavy brackets [ ] appears in the original patent but forms no part of this reissue specification; matter printed in italics indicates the additions made by reissue.

*This application is a reissue of Ser. No. 07/401,352 filed Aug. 31, 1989 now U.S. Pat. No. 5,061,401.*

The present invention relates to a composition comprising (a) at least one oxidised polycationic polyheteroaromatic compound and (b) at least one polyanion of a film-forming thermoplastic polymer containing sulfated alcohol groups

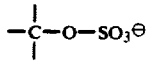

in repeating structural units, to a process for the preparation of said composition, to a method of increasing the electrical conductivity of said composition and to the use of the composition as electrically conductive material.

It is known to obtain electrically conductive salts of polycationic polyheteroaromatic compounds by electrochemical polymerisation of heteroaromatic compounds, especially pyrrole, in the presence of nonnucleophilic anions. The mechanical properties of such salts of polyheteroaromatic compounds, which are normally deposited as film on anodes, are insufficient for many applications.

To improve the mechanical properties it has been proposed to use compositions of doped polyheteroaromatic compounds in non-conductive polymers. Reference is made in this connection to the following publications: Synthetic Metals, 22 (1987), 145–156; J. of Polym. Science: P.C.E., 23 (1985), 1687–1698, Bull. Chem. Soc. Jpn., 60, 3315–3320 (1987) and European patent application 0 191 726. To avoid the concurrent use of dopants, the concurrent use of non-nucleophilic anions in the electrochemical polymerisation has been proposed, for example polystyrene sulfonates, polyvinyl sulfonates (q.v. for example European patent specification 0 129 070 and U.S. Pat. No. 4 552 927) or latices (q.v. Synthetic Metals, 15 (1986), 175–182).

Porous compositions of polypyrrole with, for example, alkylsulfates are disclosed in German Offenlegungsschrift 3 402 133. It is mentioned that sulfates containing polymeric radicals can also be used. A film-forming composition of polypyrrole and a chlorosulfonated polyvinyl alcohol is disclosed in GB patent specification 2 124 635. Although the dry film has good conductivity, it is described as tough but brittle, and hence does not have sufficient mechanical strength.

There is a need to provide electrically conductive polymer compositions which can be processed by methods of thermoplastic processing, for example compression moulding or stretch forming, and which have good mechanical properties such as good tensile and flexural strength. It would also be useful if the electrical conductivity and the mechanical properties could be substantially improved by such a processing method.

In one of its aspects, the invention relates to a composition comprising a) at least one polyheteroaromatic compound or an aniline in oxidised, polycationic form, and b) at least one polyanion of a film-forming thermoplastic polymer containing sulfated alcoholic groups

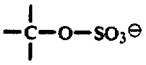

in repeating structural units.

Polyheteroaromatic compounds will be understood within the scope of this invention as meaning homopolymers and copolymers which contain repeating heteroaromatic structural units. They may be high molecular or also oligomeric, provided they are solid at room temperature and are able to form films. Preferred polyheteroaromatic compounds are those of 5- to 6-membered rings which contain 1 to 3 hetero atoms, preferably 1 hetero atom, selected from the group consisting of —O—, —S—and —N—, and the carbon atoms of which are unsubstituted or substituted by $C_1$–$C_{16}$alkyl, preferably $C_1$–$C_{12}$alkyl. Preferably two carbon atoms are not substituted, so as to be able to carry out the electrochemical polymerisation. The 5- or 6-membered ring is preferably selected from the group consisting of pyrrole, thiophene, furan, 2,2'-bipyrrole, 2,2'-bithiophene, 2,2'-bifurane, thiazole, oxazole, thiadiazole and imidazole.

Especially preferred is the polyheteroaromatic compound of a pyrrole of formula

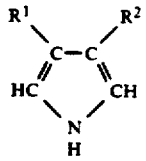

wherein $R^2$ and $R^2$ are each independently of the other hydrogen or $C_1$–$C_{16}$alkyl. $R^1$ and $R^2$ may be $C_1$–$C_{12}$alkyl, for example methyl or ethyl, and are preferably hydrogen. The NH— group of the pyrrole may be substituted by $C_1$–$C_{12}$alkyl, preferably $C_1$–$C_6$alkyl.

Anilines may be aniline itself and aniline which is substituted in 3-position by $C_1$–$C_{12}$alkyl, preferably $C_1$–$C_6$alkyl.

The composition of this invention contains, in each structural unit of the polyheteroaromatic compound, preferably 0.1 to 0.5, most preferably 0.2 to 0.4, structural units containing sulfated alcohol groups

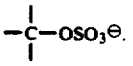

The thermoplastic polymer eligible for use in the composition of this invention containing sulfated alcoholic groups

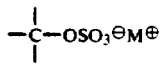

in salt form preferably has a glass transition temperature of −100° to +350° C., more particularly −50° to +250° C., measured by differential scanning calorimetry. (DCS).

The tensile strength of these thermoplastic polymers is preferably not less than 5 MPa, especially not less than 20 MPa, determined according to DIN 53 455. Depending on the nature of the polymer, the tensile strength can be up to 1000 MPa, preferably up to 500 MPa and, most preferably, up to 300 MPa. The sulfated alcohol groups in salt form may be, for example, alkali metal and ammonium salts, which are hereinafter described for the polymers.

The ratio of free alcoholic groups to sulfated alcohol groups

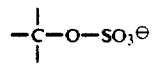

in the thermoplastic polymer can be, for example, from 50:1 to 1:50, preferably from 10:1 to 1:10.

The sulfated alcohol groups may be present in the terminal position as secondary

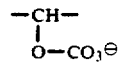

groups in the polymer backbone or as primary $—CH_2—O—SO_3\ominus$ groups in side-chains of the polymer, or in the central position as secondary

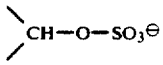

groups or as tertiary

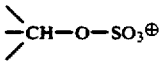

groups.

The thermoplastic polymers may be derived from polymers or mixtures thereof which contain different hydroxyl groups, for example polyesters, polyester amides, polyurethanes, polyamides, polycarbonates and polyimides obtained from hydroxyl-containing monomers, saponified polymers of vinyl esters or ethers, hydroxylated polyolefins such as polybutadiene, polyisoprene or chloroprene, polyacrylates or polymethacrylates containing hydroxyl groups in the ester moiety, polysiloxanes containing hydroxyalkyl groups or reduced polyketones or copolymers thereof; as well as copolymers of vinyl alcohol, acrylates or methacrylates or diolefins with comonomers such as acrylonitrile, olefins, diolefins, vinyl chloride, vinylidene chloride, vinyl fluoride, vinylidene fluoride, styrene, α-methylstyrene, maleic anhydride, maleimide, vinyl ethers and vinyl esters.

The sulfated thermoplastic polymers are preferably derived from polymers selected from the group consisting of polyadducts of glycidyl compounds containing on average more than one epoxy group with a diol; homopolymers and copolymers of hydroxyalkyl acrylates and methacrylates; homopolymers and copolymers of butadiene, isoprene and chloroprene whose double bonds are hydroxylated; polyimides of hydrogenated ketotetracarboxylic acids, especially benzophenonetetracarboxylic acids; hydroxyalkyl polysiloxanes; and polyesters, polyamides, polyurethanes and polyimides from $C_4$-$C_{12}$-alkenylenediols or $C_4$-$C_{12}$alkenylenediamines whose double bond is hydroxylated.

The thermoplastic polymer may be, for example, an at least partially sulfated polyadduct of a) a glycidyl compound containing on average more than one epoxy group and b) a diol which contains

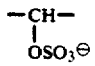

groups in the polymer chain.

The polyadducts are preferably derived from glycidyl compounds containing on average two epoxy groups in the molecule.

Particularly suitable glycidyl compounds are those containing two glycidyl, β-methylglycidyl or 2,3-epoxycyclopentyl groups attached to a hetero atom (for example a sulfur atom, preferably an oxygen or a nitrogen atom). Such compounds are in particular: bis(2.3-epoxycyclopentyl)ethers; diglycidyl ethers of polyhydric aliphatic alcohols such as 1,4-butanediol, or polyalkylene glycols such as polypropylene glycols; diglycidyl ethers of cycloaliphatic polyols such as 2,2-bis(4-hydroxycyclohexyl)propane; diglycidyl ethers of polyhydric phenols such as resorcinol, bis(hydroxyphenyl)methane, 2,2-bis(p-hydroxyphenyl)propane (diomethane), 2,2-bis(4'-hydroxy-3',5'-dibromophenyl)-propane, 1,3-bis(p-hydroxyphenyl)ethane; bis(β-methylglycidyl)ethers of the above-mentioned dihydric alcohols or dihydric phenols, diglycidyl esters of dicarboxylic acids such as phthalic acid, terephthalic acid, $\Delta^4$-tetrahydrophthalic acid and hexahydrophthalic acid; N,N-diglycidyl derivatives of primary amines and amides and heterocyclic nitrogen bases containing two nitrogen atoms, and N,N'-diglycidyl derivatives of disecondary diamides and diamines such as N,N-diglycidylaniline, N,N-diglycidyltoluidine, N,N-diglycidyl-p-aminophenylmethyl ether, N,N'-dimethyl-N,N'-diglycidyl bis(p-aminophenyl)methane; N',N''-diglycidyl-N-phenylisocyanurate; N,N'-diglycidylethyleneurea; N,N'-diglycidyl-5,5-dimethylhydantoin, N,N'-diglycidyl-5-isopropylhydantoin, N,N-methylene-bis(N',N'-diglycidyl-5,5-dimethylhydantoin), 1,3-bis(N-glycidyl-5,5-dimethylhydantoin)-2-hydroxypropane; N,N'-diglycidyl-5,5-dimethyl-6-isopropyl-5,6-dihydrouracil.

The glycidyl compounds can be reacted with aliphatic, cycloaliphatic or aromatic diols to the preferred polyadducts, in which reaction a secondary alcohol group is formed at the glycidyl group e can be sulfated.

The glycidyl compounds can also be reacted with primary aliphatic, cycloaliphatic or aromatic monoamines (for example aniline, toluidine, $C_1$-$C_{12}$alkylamines, $C_2$–$C_{12}$hydroxyalkylamines), aliphatic, cycloaliphatic or aromatic dicarboxylic acids (for example maleic acid, adipic acid, trimethyladipic acid, sebacic acid, azelaic acid, succininic acid, dodecylsuccinic acid, phthalic acid, terephthalic acid, $\Delta^4$-tetrahydrophthalic acid, hexahydrophthalic acid, 4-methylhexahydrophthalic acid, 3,6-endomethylene-$\Delta^4$-tetrahydrophthalic acid, 4-methyl-3,6-endomethylene-$\Delta^4$-tetrahydrophthalic acid), or with aliphatic, cycloaliphatic, heterocyclic or aromatic di-secondary amines or di-secondary carboxamides (for example N,N'-dimethylethylenediamine, N,N'-dimethylpropylene-1,3-diamine, N,N'-dimethylhexamethylenediamine, N,N'-dicyclohexylhexamethylenediamine, N,N',N''-trimethyldiethylenetriamine, N,N'-diethylpropylene-1,3-diamine, N-methyl-3,5,5-trimethyl-3-(methylaminomethyl)cyclohexylamine, N,N'-dimethylated or -N,N'-diethylated aromatic diamines, for example m- or p-phenylenediamine, bis(4-aminophenyl)methane or -sulfone, 2,2-bis(4-aminophenyl)propane, N,N-dimethyl-m-xylylenediamine, as well as ethyleneurea, 5,5-dimethylhydantoin, 5-isopropylhydantoin, N,N-methylenebis-5,5-dimethylhydantoin, 1,3-bis(5,5-dimethyl)-2-hydroxypropane, 5,5-dimethyl-6-isopropyl-5,6-dihydrouracil), by polyaddition to give linear polyadducts.

A preferred composition of this invention is one in which the polyadduct contains a) 100 to 5 mol % of identical or different structural units of formula I

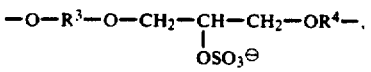

(I)

and b) 95 to 0 mol % of the identical or different structural units of formula II

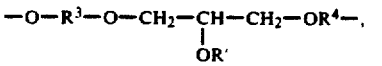

(II)

based on said polyadduct, in which formulae (I) and (II) above $R^3$ and $R^4$ are each independently of the other the radical of a diol containing aliphatic or aromatic diol groups, which radical is diminished by two hydroxyl groups, and R' is hydrogen, $C_1$–$C_{20}$alkyl, $C_1$–$C_{20}$acyl or aminocarbonyl which is N-substituted by a $C_1$–$C_{20}$hydrocarbon radical.

Preferably the polyadduct contains 90 to 20 mol %, preferably 30 to 80 mol %, of structural units of formula I, and 80 to 10 mol %, preferably 70 to 20 mol %, of structural units of formula II.

In a preferred embodiment of the invention, $R^3$ and $R^4$ are identical radicals. $R^3$ and $R^4$ as a radical having aliphatic diol groups contains preferably 2 to 12, most preferably 2 to 8 carbon atoms. The hydroxyl groups may be attached to open-chain or cyclic aliphatic radicals. A suitable aliphatic radical is typically linear or branched $C_2$–$C_{12}$-alkylene, $C_3$–$C_8$cycloalkylene, $C_1$–$C_4$alkyl-$C_6$—$C_8$cycloalkyl, cyclohexylmethylene or cyclohexyldimethylene. Illustrative examples of such radicals are ethylene, 1,2- or 1,3-propylene, 1,2-, 1,3- or 1,4-butylene, 1,2-, 1,3-, 1,4- or 1,5-pentylene, 1,2-, 1,3-, 1,4-, 1,5 or 1,6-hexylene, heptylene, octylene, nonylene, decylene, undecylene, dodecylene, 1,3-cyclopentylene, 1,3-or 1,4-cyclohexylene, 2-methyl-1,4-cyclohexylene and cyclohexyl-1,4-dimethylene.

The aromatic diol groups of the diols used for the polyadducts are preferably phenolic groups. The diol radicals carrying phenolic groups contain preferably 6 to 30, most preferably to 6 to 20, carbon atoms. A preferred embodiment of the invention relates to compositions wherein $R^3$ and $R^4$ are each independently of the other a radical of formula III

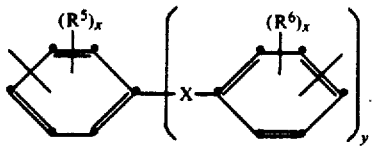

(III)

wherein X is a direct bond, $C_1$–$C_4$alkylene, $C_2$–$C_{12}$alkylidene, $C_5$–$C_8$cycloalkylidene, —O—, —S—, —SO—, $SO_2$—, —CO—, —$CO_2$—, —N($C_1$–$C_4$alkyl) or —$Si(CH_3)_2$, $R^5$ and $R^6$ are each independently of the other hydrogen, halogen, $C_1$–$C_4$alkyl, or $C_1$–$C_4$alkoxy, and x is 1 or 2 and y is 0 or 1.

X is preferably a direct bond, methylene, ethylene, $C_2$–$C_6$alkylidene. cyclohexylidene or cyclopentylidene, —O—or —S—. $R^5$ and $R^6$ are preferably hydrogen or methyl, and Y is preferably 1.

Preferably $R^3$ and $R^4$ are the radical

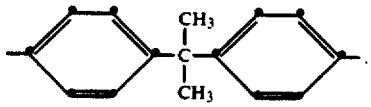

A further preferred composition of the invention is one in which the thermoplastic polymer is an at least partially sulfated homopolymer or copolymer of acrylates or methacrylates containing a

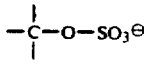

group in the ester moiety. A preferred composition of this type is one in which the polymer contains a) 100 to 5 mol % of identical or different structural units of formula Iv

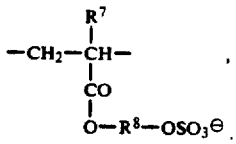

(IV)

and b) 95 to 9 mol % of identical or different structural units of formula V

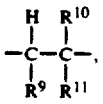

(V)

based on said polymer, in which formulae (IV) and (v) $R^7$ is hydrogen or methyl, $R^8$ is linear or branched $C_2$–$C_{18}$-alkylene, poly($C_2$–$C_6$oxaalkylene) containing 2 to 6 oxaalkylene units, $C_5$–$C_8$cycloalkylene, phenylene, benzylene or xylylene or is the group $$-CH_2-\overset{|}{C}H-CH_2-Y-R^{12}.$$

Y is —O—, $$-O-\overset{O}{\overset{\|}{C}}-$$

or —N($C_1$–$C_4$alkyl), and $R^{12}$ is $C_1$–$C_{18}$alkyl, $C_5$–$C_7$-cycloalkyl, $C_1$–$C_{12}$alkyl)-$C_5$-$C_7$,cycloalkyl, phenyl, ($C_1$–$C_{12}$alkyl)phenyl, benzyl or ($C_1$–$C_{12}$alkyl)benzyl, $R^9$ is hydrogen, $C_1$–$C_6$alkyl, —$COOR^{12}$ or —$COO^{\ominus}$, $R^{10}$ is hydrogen, fluoro, chloro, cyano or $C_1$–$C_6$alkyl, and $R^{11}$ is hydrogen, fluoro chloro, cyano, $R^{12}$ is —O—, $C_1$–$C_{12}$alkyl, —$COO^{\ominus}$, —$COOR^{12}$, —$COOR^8$—OH, —OCO—$R^{12}$ or phenyl, where $R^8$ and $R^{12}$ have the given meanings.

Preferably the polymer contains 90 to 20 mol %, most preferably 80 to 30 mol %, of structural units of formula IV, and 80 to 10 mol %, most preferably 70 to 20 mol %, of structural units of formula V.

$R^8$ as alkylene contains preferably 2 to 12, more particularly 2 to 8 and, most preferably, 2 to 6, carbon atoms. Illustrative examples of such groups are ethylene and the isomers of propylene, butylene, pentylene, hexylene, heptylene, octylene, nonylene, decylene, undecylene, dodecylene, tetradecylene, hexadecylene, and octadecylene. Preferred groups are ethylene, 1,2- and 1,3-propylene, 1,2-, 1,3- and 1,4-butylene, 1,2-, 1,3-, 1,4-and 1,5-pentylene, and 1,2-, 1,3-, 1,4-, 1,5- and 1,6-hexylene. $R^8$ as poly(oxaalkylene) preferably contains 2 to 4 oxaalkylene units and preferably 2 to 4, most preferably 2 or 3, carbon atoms in the alkylene moiety.

$R^8$ as cycloalkylene is preferably cyclopentylene or cyclohexylene.

Polymers in which $R^8$ is the group $$-CH_2-\overset{|}{C}H-CH_2-Y-R^{12}$$

are reaction products of glycidyl esters of poly- or copoly(meth)acrylic acid with a compound $R^{12}$-Y-H which contains active hydrogen.

Y is preferably —O— ode $$-O\overset{O}{\overset{\|}{C}}-$$

$R^{12}$ may be linear or branched alkyl of 1 to 18, preferably 1 to 12 most preferably, 1 to 6, carbon atoms. $R^{12}$ as cycloalkyl is preferably cyclopentyl or cyclohexyl. Where $R^{12}$ is ($C_1$–$C_{12}$alkyl)cycloalkyl, the cycloalkyl moiety is preferably cyclopentyl or cyclohexyl, and the alkyl moiety may be linear or branched and contains preferably 1 to 6, most preferably 1 to 4, carbon atoms. Where $R^{12}$ is alkylphenyl or alkylbenzyl, the alkyl moiety may be linear or branched and contains preferably 1 to 6, most preferably 1 to 4, carbon atoms.

$R^9$ is preferably hydrogen. $R^9$ as alkyl is preferably methyl or ethyl. Where $R^9$ is —$COOR^{12}$, $R^{12}$ is preferably $C_1$–$C_{12}$alkyl, most preferably $C_1$–$C_6$alkyl.

$R^{10}$ as alkyl is preferably $C_1$–$C_4$alkyl, typically methyl, ethyl, n-propyl and n-butyl. $R^{10}$ is preferably hydrogen, chloro or $C_1$–$C_4$alkyl.

Where $R^{11}$ is the group $R^{12}$—O—, $R^{12}$ is preferably $C_1$–$C_{12}$alkyl, preferably $C_1$–$C_6$alkyl. An alkyl group $R^{11}$ preferably contains 1 to 6, most preferably 1 to 4, carbon atoms. Where $R^{11}$ is the group —$COOR^{12}$, $R^{12}$ is preferably $C_1$–$C_{12}$alkyl, most preferably $C_1$–$C_6$alkyl, cyclopentyl or cyclohexyl. Where $R^{11}$ is the group —OCO—$R^{12}$, $R^{12}$ is preferably $C_1$–$C_{12}$alkyl, most preferably $C_1$–$C_6$alkyl, phenyl or benzyl.

Where $R^{11}$ is the group —$COOR^8$—OH, $R^8$ has the preferred meanings assigned to it previously.

In a preferred embodiment of the invention, $R^9$ is hydrogen, fluoro, chloro, methyl or ethyl, and $R^{11}$ is fluoro, chloro, cyano, $C_1$–$C_4$alkyl, $C_1$–$C_6$alkoxy, —COO—$C_1$–$C_6$alkyl, —COO—$R^8$—OH, —OCC—$C_1$–$C_6$alkyl or phenyl.

R′ as $C_1$–$C_{20}$alkyl may be linear or branched. R′ as acyl may be $C_1$–$C_{20}$-alkyl—CO—, $C_5$–$C_8$-cycloalkyl—CO—, $C_1$–$C_{15}$-alkyl-$C_5$–$C_8$-cycloalkyl—CO, $C_5$–$C_8$-cycloalkyl-$CH_2$—O—, $C_1$–$C_{14}$-alkyl-$C_5$–$C_8$-cycloalkyl—$CH_2CO$, phenyl—CO, benzyl—CO, $C_1$–$C_{14}$-alkylphenyl—CO— or $C_1$–$C_{14}$alkylbenzyl—CO. The hydrocarbon radical radical in the aminocarbonyl may be $C_1$–$C_{20}$—alkyl—, $C_5$–$C_8$—cycloalkyl, $C_1$–$C_{15}$-alkyl—$C_5$–$C_8$-cycloalkyl—, $C_5$–$C_8$—cycloalkyl—$CH_2$—, $C_1$–$C_{14}$-alkyl-$C_5$–$C_8$-cycloalkyl—$CH_2$—, phenyl, benzyl, $C_1$–$C_{14}$-alkylphenyl or $C_1$–$C_{14}$alkylphenyl or $C_1$–$C_{14}$alkylbenzyl. R′ is preferably hydrogen.

Particularly preferred compositions are those wherein the polymer contains structural units of formula IV in which $R^7$ is hydrogen or $CH_3$, and $R^8$ is linear or branched $C_2$–$C_6$alkylene, cyclopentylene or cyclohexylene, and structural units of formula V wherein $R^9$ is hydrogen, $R^{10}$ is hydrogen or methyl, and $R^{11}$ is —$COOR^{12}$ or —$COOR^8$—OH.

A further preferred embodiment of the invention relates to compositions wherein the thermoplastic polymer is an at least partially sulfated polyvinyl alcohol or polyvinyl alcohol copolymer containing $$-\underset{\underset{O-SO_3^{\ominus}}{|}}{CH}$$

groups. Preferably the composition contains polyvinyl alcohol copolymers.

Preferred compositions are those wherein the copolymer contains a) 90 to 5 mol % of structural units of formula VI $$-\underset{\underset{H}{|}}{\overset{\overset{H}{|}}{C}}-\underset{\underset{OSO_3^{\ominus}}{|}}{\overset{\overset{H}{|}}{C}}- \quad (VI)$$

and b) 95 to 10 mol % of identical or different structural units of formula V $$-\underset{\underset{R^9}{|}}{\overset{\overset{H}{|}}{C}}-\underset{\underset{R^{11}}{|}}{\overset{\overset{R^{10}}{|}}{C}}- \quad (V)$$

in which formulae (VI) and (V) $R^9$, $R^{10}$ and $R^{11}$ have the meanings assigned to them above.

Preferably the copolymer contains 70 to 10 mol %, most preferably 60 to 20 mol %, of structural units of formula IV, and 30 to 90 mol %, most preferably 40 to 80 mol %, of structural units of formula V.

In formula V, $R^9$, $R^{10}$ and $R^{11}$ have the preferred meanings previously assigned to them.

Especially preferred compositions are those wherein $R^9$ and $R^{10}$ are hydrogen and $R^{11}$ is —$OCOR^{12}$, wherein $R^{12}$ is $C_1$–$C_{18}$alkyl, $C_5$–$C_7$-cycloalkyl, ($C_1$–$C_{12}$alkyl)-$C_5$–$C_7$cycloalkyl, phenyl, benzyl, ($C_1$–$C_{12}$alkyl)phenyl or ($C_1$–$C_{12}$alkyl)benzyl.

The polyanions of component b) in the compositions of this invention ar derived from polymeric salts which are known or obtainable by methods which are known per se. These salts are film-forming thermoplastic polymers containing sulfated alcohol groups —C—O—$SO_3\ominus M\oplus$ in repeating structural units, in which $M\oplus$ is an alkali metal cation or ammonium cation.

The sulfated alcohol groups may be present as secondary

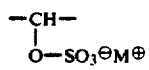

groups in the polymer backbone, or in terminal position as primary —$CH_2$—$SO_3\ominus M\oplus$ groups in side-chains of the polymer, or in central position as secondary

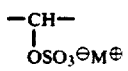

groups or as tertiary

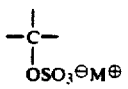

groups.

The glass transition temperature of the polymers can be from −100 to +350° C., preferably from −50° to +250° C., measured by the DSC. The tensile strength is preferably not less than 5 MPa, most preferably 10 MPa, determined in accordance with DIN 53 455. Depending on the nature of the polymer, the tensile strength may be up to 1000 MPa, preferably up to 500 MPa and, most preferably, up to 300 MPa.

The degree of polymerisation of the polymers may be, for example, from 5 to 10 000, preferably from 10 to 5 000 and, most preferably, from 10 to 1000.

Preferred polymers are those wherein the ratio of free alcohol groups to sulfated alcohol groups in the polymer is from 50:1 to 1:50, preferably from 10:1 to 1:10.

The ammonium cation may be $NH_4\oplus$, a protonated primary, secondary or tertiary amine, or quaternary ammonium or pyridinium. The primary amine may contain 1 to 18 carbon atoms, preferably 1 to 12 and, most preferably, 1 to 6, carbon atoms, the secondary amine may contain 2 to 24 carbon atoms, preferably 2 to 12 and, most preferably 2 to 8, carbon atoms, the tertiary amine may contain 3 to 30 carbon atoms, preferably 3 to 18 and, most preferably 3 to 12, carbon atoms, and the quaternary ammonium may contain 4 to 36 carbon atoms, preferably 4 to 24 and, most preferably 4 to 18, carbon atoms.

Preferred polymers are those wherein $M\oplus$ is $Li\oplus$, $Na\oplus$ or $K\oplus$, or is $R^{13}R^{14}R^{15}R^{16}N\oplus$, wherein $R^{13}$, $R^{14}$, $R^{15}$ and $R^{16}$ are each independently of one another hydrogen, unsubstituted or hydroxyl-substituted $C_1$–$C_{18}$-alkyl, phenyl, ($C_1$–$C_{12}$alkyl)phenyl, ($C_1$–$C_{12}$alkyl)benzyl, $C_5$–$C_7$-cycloalkyl, ($C_1$–$C_{12}$-alkyl)-$C_5$–$C_7$-cycloalkyl, or $R^{13}$ und $R^{14}$, when taken together, are tetramethyhlene, pentamethylene or 3-oxapentylene, and $R^{15}$ and $R^{16}$ have the above meanings. A preferred embodiment of the invention relates to polymers wherein at least one of $R^{13}$ to $R^{16}$ is not hydrogen.

Alkyl groups $R^{13}$ to $R^{16}$ may be linear or branched and contain preferably 1 to 12, most preferably 1 to 6, carbon atoms. Illustrative of such groups are methyl, ethyl, n- and isopropyl, n-butyl, isobutyl and tert-butyl, pentyl, hexyl, heptyl, octyl, nonyl, decyl, dodecyl, tetradecyl, hexadecyl and octadecyl.

Hydroxyalkyl groups $R^{13}$ to $R^{16}$ may be linear or branched and contain preferably 2 to 18, more particularly 1 to 12 and, most preferably, 2 to 6, carbon atoms. Typical examples are 2-hydroxyeth-1-yl, 1- or 2-hydroxyprop-3-yl, 1-hydroxybut-4-yl and 1-hydroxyhex-6-yl.

Exemplary of alkylphenyl and alkylbenzyl are methylphenyl, dimethylphenyl, ethylphenyl, n- or isopropylphenyl, n-, iso- or tert-butylphenyl, hexylphenyl, octylphenyl, decylphenyl, dodecylphenyl and suitably alkylated benzyl radicals $R^{13}$ to $R^{16}$ as cycloalkyl are preferably cyclopentyl or cyclohexyl.

$R^{13}$ to $R^{16}$ as alkylcycloalkyl are preferably ($C_1$–$C_{12}$-alkyl)cyclopentyl or ($C_1$–$C_{12}$alkyl)cyclohexyl.

Most preferably, $R^{13}$ to $R^{16}$ are $C_1$–$C_6$-alkyl.

The polymers may be derived from different hydroxyl group containing polymers, for example polyesters, polyester amides, polyurethanes, polyamides, polycarbonates and polyimides obtained from hydroxyl group containing monomers, saponified polymers of vinyl esters or ethers, hydroxylated polydiolefins such as polybutadiene, polyisoprene or choroprene, polyacrylates or polymethacrylates containing hydroxyalkyl groups in the ester moiety, polysiloxanes containing hydroxyalkyl groups or reduced polyketones or copolymers thereof; and also copolymers of vinyl alcohol, acrylates or methacrylates or diolefins with comonomers, for example acrylonitrile, olefins, diolefins, vinyl chloride, vinylidene chloride, vinyl fluoride, vinylidene fluoride, styrene, α-methylstyrene, maleic anhydride, maleimide, vinyl ethers and vinyl esters.

Such polymers are known or can be prepared by commonly known methods. Depending on the nature of the polymer and of the process conditions, hydroxyl groups in the monomers employed are protected by customary protective groups.

In a preferred embodiment of the invention, the polymers are an at least partially sulfated polyadduct of a) a glycidyl compound containing on average more than one epoxy group and (b) a diol which contains

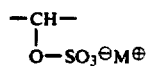

groups in the polymer chain. Preferred polyadducts are previously mentioned herein. Such polymers are disclosed in U.S. Pat. No. 3 402 221.

Preferred polyadducts are those wherein the polyadduct contains a) 100 to 5 mol % of identical or different structural units of formula I $$-O-R^3-O-CH_2-\underset{\underset{OSO_3\ominus M\oplus}{|}}{CH}-CH_2-OR^4-, \qquad (I)$$

and b) 95 to 0 mol % of identical or different structural units of formula II $$-O-R^3-O-CH_2-\underset{\underset{OR'}{|}}{CH}-CH_2-OR^4-, \qquad (II)$$

based on the polyglycidyl ether, in which formulae (I) and (II) above $R^3$ and $R^4$ are each independently of the other the radical of a diol containing aliphatic or aromatic diol groups, which radical is diminished by two hydroxyl groups, and R' is hydrogen, $C_1$-$C_{20}$alkyl, $C_1$-$C_{20}$acyl or aminocarbonyl which is N-substituted by a $C_1$-$C_{20}$hydrocarbon radical.

Especially preferred polyadducts are those wherein $R^3$ and $R^4$ are each independently of the other a radical of formula III

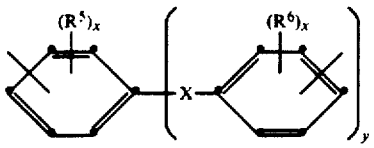

wherein X is a direct bond, $C_1$-$C_4$alkylene, $C_2$-$C_{12}$alkylidene, $C_5$-$C_8$cycloalkylidene, —O—, —S—, —SO—, $SO_2$—, —CO—, —$CO^2$—, —N($C_1$-$C_4$alkyl) or —$Si(CH_3)_2$, $R^5$ and $R^6$ are each independently of the other hydrogen, halogen, $C_1$-$C_4$alkyl, or $C_1$-$C_4$alkoxy, and x is 1 or 2 and y is 0 or 1.

Preferably $R^3$ and $R^4$ are the radical

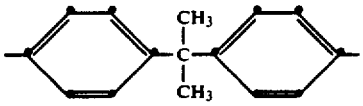

$R^3$, $R^4$, $R^5$, $R^6$, X, y and x have the preferred meanings previously assigned to them, and the preferred content of structural units is likewise as previously indicated.

A further preferred embodiment of the invention relates to those polymers in which the thermoplastic polymer is an at least partially sulfated homopolymer or copolymer of acrylates or methacrylates containing a $$-\overset{|}{\underset{|}{C}}-O-SO_3\ominus M\oplus$$

group in the ester moiety. Such polymers are disclosed, for example, in U.S. Pat. No. 4 341 647 and 4 288 427.

Especially preferred polymers are those wherein the polymer contains a) 100 to 5 mol % of identical or different structural units of formula IV $$-\overset{|}{\underset{|}{C}}-O-SO_3\ominus$$

and b) 95 to 0 mol % of identical or different structural units of formula V $$-\overset{H}{\overset{|}{\underset{R^9}{\underset{|}{C}}}}-\overset{R^{10}}{\overset{|}{\underset{R^{11}}{\underset{|}{C}}}}-, \qquad (V)$$

based on said polymer, in which formulae (IV) and (V) $R^7$ is hydrogen or methyl, $R^9$ is linear or branched $C_2$-$C_{18}$-alkylene, poly($C_2$-$C_6$oxaalkylene) containing 2 to 6 oxaalkylene units, $C_5$-$C_6$cycloalkylene, phenylene, benzylene or xylylene or is the group $$-CH_2-\overset{|}{CH}-CH_2-Y-R^{12},$$

Y is —O—, $$-O-\overset{O}{\overset{\|}{C}}-$$

or —N($C_1$-$C_4$alkyl), and $R^{12}$ is $C_1$-$C_{18}$alkyl, $C_5$-$C_7$cycloalkyl, ($C_1$-$C_{12}$alkyl)-$C_5$-$C_7$cycloalkyl, phenyl, ($C_1$-$C_{12}$alkyl)phenyl, benzyl or ($C_1$-$C_{12}$alkyl)benzyl, $R^9$ is hydrogen, $C_1$-$C_6$alkyl, —$COOR^{12}$ or —COO⊖, $R^{10}$ is hydrogen, fluoro, chloro, cyano or $C_1$-$C_6$alkyl, and $R^{11}$ is hydrogen, fluoro chloro, cyano, $R^{12}$ is —O—, $C_1$-$C_{12}$alkyl, —COO⊖, —$COOR^{12}$, —$COOR^8$—OH, OCO—$R^{12}$ or phenyl, where $R^8$ and $R^{12}$ have the given meanings.

Particularly preferred polymers are those wherein the polymer contains structural units of formula IV in which $R^7$ is hydrogen or $CH_3$, and $R^8$ is linear or branched $C_2$-$C_6$alkylene, cyclopentylene or cyclohexylene, and structural units of formula V wherein $R^9$ is hydrogen, $R^{10}$ is hydrogen or methyl, and $R^{11}$ is —$COOR^{12}$ or —$COOR^8$—OH.

$R^7$ to $R^{12}$ and Y have the preferred meanings previously assigned to them, and the preferred content of structural units is likewise as previously indicated.

Another embodiment of the invention relates to polymers wherein the thermoplastic polymer is an at least partially sulfated polyvinyl alcohol or sulfated polyvinyl alcohol copolymer containing $$-\underset{\underset{O-SO_3\ominus}{|}}{CH}$$

groups. Preferably the composition contains polyvinyl alcohol copolymers.

Preferred copolymers are those wherein the copolymer contains a) 90 to 5 mol % of structural units of formula VI

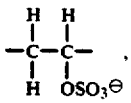

(VI)

and b) 95 to 10 mol % of identical or different structural units of formula V

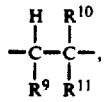

(V)

in which formulae (VI) and (V) $R^9$, $R^{10}$ and $R^{11}$ have the meanings assigned to them above.

Particularly preferred copolymers are those wherein $R^9$ and $R^{10}$ are hydrogen and $R^{11}$ is —$OCOR^{12}$, wherein $R^{12}$ is $C_1$–$C_{18}$alkyl, $C_5$–$C_7$-cycloalkyl, ($C_1$–$C_{12}$alkyl)-$C_5$–$C_7$cycloalkyl, phenyl, benzyl, ($C_1$–$C_{12}$alkyl)phenyl or ($C_1$–$C_{12}$alkyl)benzyl.

$R^9$ to $R^{12}$ have the preferred meanings previously assigned to them, and the preferred content of structural units is likewise as previously indicated.

Polysiloxanes containing sulfated and hydroxyalkyl groups in salt form are disclosed in JP-A-180690.

Polyimides containing hydroxyl groups are obtainable, for example, from ketotetracarboxylic acids by hydrogenating the keto group prior to the polyimide formation. Thus, for example, benzophenone-3,4-carboxylic acid anhydride can be converted into bis(benzene-3,4-carboxylic acid anhydride) methanol or the acids or esters thereof.

Sulfated hydroxyl group containing polyesters, polyamides, polyimides and polyurethanes eligible for use in the practice of this invention may be prepared by first preparing corresponding unsaturated polymers from unsaturated monomers, for example unsaturated dicarboxylic acids like maleic acid or fumaric acid, or from alkenylenediols or alkenylenediamines, for example from 1,4-but-2-ene-diol or 1,4-but-2-ene-diamine. The double bonds in the polymers can then be epoxidised—as also in polybutadiene, polyisoprene or chloroprene - with peracids, and the epoxide ring subsequently opened, for example by hydrolysis. The hydroxyl groups can then be sulfated (q.v. for example M. L. Hallensleben in Houben Weyl, Vol. E20, page 1994 et seq.).

The thermoplastic polymers eligible for use in the practice of this invention can be obtained in known manner by reacting a thermoplastic, film-forming polymer which contains alcohol groups

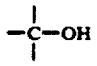

in repeating structural units, in an inert solvent, with $SO_3$, subsequently neutralising the reaction mixture with an alkali metal base or ammonium base, and isolating the polymer.

The process is known per se. The $SO_3$ can be introduced, for example in gaseous form, into the reaction solution. It is preferred to use a pyridine/$SO_3$ complex which is commercially available.

Suitable inert solvents are preferably polar aprotic solvents, the choice of solvent depending principally on the solubility of the hydroxyl group containing polymer. The solvents may be used singly or as a mixture of at least two solvents. Illustrative of suitable solvents are: ethers such as dibutyl ether, tetrahydrofuran, dioxan, methylene glycol, dimethylethylene glycol, dimethyl diethylene glycol, diethyl diethylene glycol, dimethyl triethylene glycol, halogenated hydrocarbons such as methylene chloride, chloroform, 1,2-dichloroethane, 1,1,1-trichloroethane, 1,1,2,2-tetrachloroethane, and lactones such as γ-butyrolactone, o-valerolactone and pivalolactone, carboxamides and lactams such as N,N-dimethylformamide, N,N-diethylformamide, N,N-dimethylacetamide, N-methyl-γ-butyrolactam, N-methyl-ε-caprolactam, N-methylpyrrolidone, N-acetylpyrrolidone, tetramethylurea, hexamethylphosphoramide, sulfoxides such as dimethyl sulfoxide, sulfones such as dimethyl sulfone, diethyl sulfone, trimethyl sulfone, tetramethylene sulfone, N-methylpyrrolidine, N-methylpiperidine, N-methylmorpholine, substituted benzenes such as benzonitrile, chlorobenzene, o-dichlorobenzene, 1,2-trichlorobenzene and nitrobenzene.

The reaction temperature is, for example, in the range from 20° to 150° C., preferably from 40° to 100° C. The reaction time is ca. 5 to 10 hours. Upon completion of the reaction, the reaction mixture is neutralised, when $SO_3$is gaseous form is used, with an aqueous solution of an alkali metal base or ammonium hydroxide, or with an aqueous or organic solution of an amine hydroxide. When amine/$SO_3$ complexes are used, for example a pyridine/$SO_3$ complex, the corresponding ammonium salts are formed, which can be directly used in the electrochemical process. It is also possible to replace the ammonium groups in said salts by stronger bases. The salts of the sulfated polymers are usually precipitated with water. The polymer is then isolated by filtration, and can be purified by washing with water or an organic non-solvent and thereafter dried.

Polyolefins can also be prepared by, for example, radical polymerisation of acrylates and methacrylates containing —O—$SO_3M^{\oplus}$ radicals in the ester moiety, without or together with olefin comonomers.

The eligible salts of sulfated hydroxyl group containing polymers also have thermoplastic properties. Compared with the starting polymers, their glass transition temperature is substantially unchanged and they are distinguished by their mechanical properties, for example by high tensile and flexural strength and high flexibility. They are highly suitable polyanions for electrically conductive polycations of polyheteroaromatic compounds.

Such compositions are prepared in a manner known per se by electrochemically polymerising, in an aqueous, aqueous-organic or organic solution, a heteroaromatic compound or an aniline, in the presence of a sulfated polymer salt, and subsequently removing the composition from the anode. The composition is normally deposited as a film which, depending on the duration of the electrolysis and on the current density, may have a thickness of, for example, 1 to 500 μm or 10 to 300 μm.

The electrolysis can be carried out potentiostatically or galvanostatically. Suitable anode materials are, for example, metals (titanium, nickel, platinum, steel) or ITO glass. The current density can be, for example, from 0.5 to 20 mA/cm$^2$, preferably from 1 to 5 mA/cm$^2$.

The concentration of sulfated polymer salt can be from 0.05 to 1 mol/l, preferably from 0.01 to 0.5 mol/l, based on the reaction mixture. The concentration of hetero atoms or aniline can be 0.01 to 10% by volume, preferably 0.1 to 5% by volume, based on the volume of the reaction mixture.

Suitable organic solvents are electrochemically inert and, for example, protic or aprotic and polar. Suitable solvents are those listed above. Preferred solvents are carbonates, especially propylene carbonate.

Examples of further suitable solvents are acetonitrile, methylene chloride, propionitrile, nitromethane, and alkanols and water.

A preferred embodiment of the process comprises carrying out the polymerisation in an organic solvent, $M^{\oplus}$ being an ammonium cation having at least one organic group. $M^{\oplus}$ is in this connection preferably $R^{13}R^{14}R^{15}R^{16}N^{\oplus}$, wherein $R^{13}$ to $R^{16}$ are each independently of one another unsubstituted or hydroxyl-substituted $C_1$–$C_{18}$alkyl, phenyl, ($C_1$–$C_{12}$-alkyl)phenyl, ($C_1$–$C_{12}$-alkyl)benzyl, $C_5$–$C_7$-cycloalkyl, ($C_1$–$C_{12}$-alkyl)-$C_5$–$C_7$-cycloalkyl or $R^{13}$ and $R^{14}$, when taken together, are tetramethylene, pentamethylene or 3-oxapentylene, and $R^{15}$ and $R^{16}$ are as previously defined above. More particularly, $R^{13}$ to $R^{16}$ are $C_1$–$C_6$-alkyl, for example methyl, ethyl, n-propyl and, preferably, n-butyl.

The electrochemical polymerisation can also be carried out in water or aqueous-organic solution. The concurrent use of buffers is expedient. Suitable buffers are typically alkylammonium phosphates contatining 1 to 3, preferably 2 or 3, alkyl groups in the ammonium moiety, which alkyl groups may contain 1 to 6, preferably 1 to 4, carbon atoms. Examples of suitable buffers are trimethylammonium phosphate, triethylammonium phosphate, tri-n-propylammonium phosphate and tri-n-butylammonium phosphate. Suitable buffers are also cation exchangers in their protonated form.

It is also possible to add to the reaction mixture further substances which deposit concurrently on the anode, for example anionic plasticisers or anionic dyes.

Upon termination of the electrolysis, the compositions of the invention can be removed or peeled off from the anode in the form of films and purified by washing with solvents. The films can be cut to filaments.

The compositions of this invention have high conductivities which are usually above 0.1 S/cm. They further have valuable mechanical properties such as high toughness, tensile strength, flexural strength and flexibility. Surprisingly, it has been found that the compositions of this invention have low glass transition temperatures, so that even where polyanion concentration is low, processing by thermoplastic moulding methods is possible without loss of electrical conductivity.

The compositions of this invention can be used, for example, as electrical conductors, electrodes, cathodes for batteries, electromagnetic screening materials, electrically conductive filaments, sensors, antistatic packing material, or conductive sealing material.

It has also surprisingly been found that the compositions of this invention can be processed by methods for thermoplastic polymers, for example by moulding methods and, especially, by drawing methods (deep drawing) below the melting and decomposition temperatures, preferably in the range of the glass transition temperatures. Besides an increase in mechanical strength, an appreciable, for example an up to five-fold, increase in the electrical conductivity in the direction of drawing has surprisingly been found.

A further object of the invention is a process for increasing the electrical conductivity in a film or in filaments of the novel composition, which comprises drawing said film or filaments below the melting or decomposition temperature, preferably in the range of the glass transition temperature.

Drawing is preferably carried out at a temperature which is in the range of 20° C. below or above the glass transition temperature.

Utilities for the drawn material have been mentioned above in connection with non-drawn material. These utilities constitute a further object of the invention.

The following Examples illustrate the invention in more detail. The glass transition temperature (Tg) is determined by differential scanning calorimetry (DSC). The conductivity is determined by the four-point method. The tensile strength is determined in accordance with DIN 53 455.

A) Preparation of sulfated polymer salts

EXAMPLE A1

Sulfated polyadduct of bisphenol A diglycidyl ether and bisphenol A (sulfation of all OH groups)

28.4 g of polyadduct having an average molecular weight of 26 800 (degree of polymerisation ca. 100) are dissolved at 50° C. in 150 ml of dimethyl formamide (DMF). To this solution are added 17.5 g of sulfur trioxide/pyridine complex in 20 ml of DMF. After 5 hours, the reaction mixture is cooled to 5° C. and a solution of 88 g of $(n\text{-}C_4H_9)_4N^{\oplus}OH^{\ominus} \times 30\ H_2O$ in 100 ml of DMF is added. The reaction mixture is poured into water and the precipitated polymer salt is isolated by filtration, washed with water and dried. Yield: 50 g (83 % of theory) of polymer salt with a Tg of 87° C.

EXAMPLE A2

Sulfated linear polyadduct of bisphenol A diglycidyl ether and bisphenol A (sulfation of every third OH group)

28.4 g of polyadduct according to Example 1 in 100 ml of DMF, 5.3 g of sulfur trioxide/pyridine complex and 29.3 g of $(n\text{-}C_4H_9)_4N^{\oplus}OH^{\ominus} \times 30\ H_2O$ in 50 ml of DMF are reacted and worked up as described in Example 1. Yield: 28.6 g (73 % of theory) of polymer salt with a Tg of 99° C.

EXAMPLE A3

Sulfated linear polyadduct of bisphenol A diglycidyl ether and bisphenol A (sulfation of every fifth OH group) 284 g of polyadduct according to Example 1 in 400 ml of DMF, 33.4 g of sulfur trioxide/pyridine complex and 160 g of $(n\text{-}C_4H_9)_4N^{\beta}OH^{\ominus} \times 30\ H_2O$ in 100 ml of DMF are reacted and worked up as described in Example 1. Yield: 89 % of theory) of polymer salt with a Tg of 101.5° C.

EXAMPLE A4

Copolymer (10:1) of methyl methacrylate and 3-sulfatopropylmethacrylate tetrabutylammonium salt 43.3 g of a copolymer (10:1) of methyl methacrylate and 3-hydroxypropyl methacrylate are dissolved at 50° C. in 300 ml of DMF. To this solution are added 7.26 g of sulfur trioxide/pyridine complex. After 5 hours, the reaction mixture is cooled to 5° C. and neutralised with tetrabutylammonium hydroxide 30-hydrate in 30 ml of DMF. The reaction mixture is poured into water and the precipitated product is isolated by filtration and dried, affording 45.3 g (80.3 % of theory) of polymer salt with a Tg of 127.6° C. The melting point is 193° C.

EXAMPLE A5

Copolymer (1:1) of methyl methacrylate (MMA) and 3-sulfatopropylmethacrylate tetrabutylammonium salt 45 g of a 1:1 copolymer of MMA and 3-hydroxypropyl methacrylate are dissolved at 50° C. in 300 ml of DMF. To this solution are added 33.96 g of sulfur trioxide/pyridine complex. After 5 hours, the reaction mixture is cooled to 5° C. and neutralised with tetrabutylammonium hydroxide 30-hydrate (170 g in 200 ml of DMF). The reaction solution is poured into water and the precipitate is isolated by filtration and dried, affording 87 g (81.3 % theory) of polymer salt with a Tg of 84.6° C.

EXAMPLE A6

Copolymer of 2-tetrabutylammoniumsulfatoethyl methacrylate/methylmethacrylate (1:2)

20 g (44.3 mmol) of 2-tetrabutylammonium sulfatoethyl methacrylate and 8.87 g (88.69 mmol) of methyl methacrylate are dissolved in 100 ml of acetonitrile and the solution is deaerated. After addition of 30 mg of azoisobutyronitrile, the reaction solution is stirred for 36 hours at 60° C. and then concentrated to dryness under vacuum. The residue is taken up in water, the solution is filtered, and the residue is lyophilised, Yield: 20.8 g (72 % theory) of copolymer with a Tg of 85.4° C.

EXAMPLE A7

Sulfated polybutadienes

Epoxidisation (every 4th alkene group) 57.5 g (1 mol) of cis-polybutadiene (Aldrich) are dissolved in 1000 ml of chloroform. To this solution are slowly added dropwise 43 g (0.25 mol) of 3-chloroperbenzoic acid in 500 ml of chloroform. After stirring for 12 hours, the solution is poured into methanol and the precipitated polymer is isolated by filtration and washed repeatedly with methanol.

Hydrolysis of the epoxy groups

The still moist polymer is dissolved in 1000 ml of tetrahydrofuran (THF). To this solution are slowly added 54.3 ml of 36 % HCl. After 12 hours, the reaction solution is poured into methanol and the precipitated polymer is washed repeatedly with methanol and dried under vacuum at 40° C.

Sulfation

The dry polymer is dissolved in 500 ml of DMF and to this solution are added 39.75 g (0.25 mol) of pyridine/sulfur trioxide complex. After a reaction time of 5 hours, the reaction solution is neutralised with 46.25 g (0.25 mol) of tributylamine at ca. 10° C. The solution is poured into water and the precipitated polymer is treated repeatedly for some time with water and subsequently dried under a high vacuum. Yield: 110 g (85 % of theory, based on polybutadiene).

| | Elemental analysis: | | | | | |
|---|---|---|---|---|---|---|
| | % C | % H | % N | % O | % S | % Cl |
| cal.: | 64.5 | 7.54 | 2.69 | 12.28 | 6.15 | 6.8 |
| found.: | 64.1 | 7.7 | 2.7 | 12.5 | 5.9 | 6.5 |

Tg = −46.1° C.; m/(n+m): 0.25.

EXAMPLES A8 und A9

Polymers with different degrees of epoxidation and sulfation are prepared in similar manner:

| Composition of the copolymer: n: number of butadiene units m: number of sulfated butadiene units | | |
|---|---|---|
| Example | m/(n + m) | Tg/°C. |
| A8 | 0.16 | −48.3 |
| A9 | 0.11 | −56.7 |

EXAMPLE A10

Copolymer of MMA and 10-hydroxydecyl methacrylate 12 6 g (0.126mol) of MMA and 7.38 g (0.03 mol) of 10-hydroxydecyl methacrylate are dissolved in 40 ml of THF. The solution is then warmed to 55° C. Over a period of 3 hours, a solution of 50 ml of azoisobutyronitrile in 10 ml of THF is added dropwise and, after 20 hours at 55° C., the reaction solution is poured into methanol/water to precipitate the copolymer. Yield: 17 g (85% of theory). Rel. visc.: 0.59 dl/g (in chloroform).

Sulfation 15 g (0.0223 mol, based on the copolymer compositions) of the above copolymer are dissolved at 50° C. in 100 ml of DMF and to this solution are added 4.086 g (0.0257 mol) of sulfur trioxide/pyridine complex. After 2 hours, the reaction solution is neutralised with 6.11 ml (0.0257 mol) of tributylamine at a temperature below 10° C. The solution is poured into water and the precipitated polymer is isolated by filtration and dried at 50° C. under vacuum. Yield: 18.5 g (98.3 % of theory). Tg: 148.2° C.

| | Elemental analysis: | | | | | |
|---|---|---|---|---|---|---|
| | % C | % H | % N | % O | % S | % $H_2O$ |
| cal.: | 60.36 | 9.44 | 1.71 | 24.5 | 3.92 | 1.1 |
| found.: | 60.2 | 9.4 | 2.2 | 25.3 | 3.1 | 1.1 |

EXAMPLE A11

Copolymer of MMA and 4-hydroxybutyl methacrylate.

The polymer is prepared in accordance with Example 10. Tg: 153.5° C.

| | Elemental analysis: | | | | | |
|---|---|---|---|---|---|---|
| | % C | % H | % N | % O | % S | % $H_2O$ |
| cal.: | 56.7 | 8.9 | 1.89 | 28.1 | 4.3 | 2.4 |
| found.: | 56.6 | 8.8 | 2.5 | 27.8 | 3.9 | 2.0 |

m/(n + m) = 0.25
m: number of MMA units
n: number of sulfated hydroxybutyl methacrylate units.

EXAMPLES A12–A15

Sulfated polymides

Synthesis of the tetracarboxylic acid component (TCC)

0.62 mol of benzophenone-3,4-dianhydride are heated to the boil in 500 ml of methanol until a clear solution forms. After cooling to room temperature, the keto groups is reduced with hydrogen under normal pressure (catalyst: 1 g of 5 % Pd/C). The catalyst is separated and the solution is concentrated to dryness. The resultant mixture consisting of bis[3-carboxy-4-(carbomethoxy)phenyl]methanol and two further isomers is isolated in a yield of 82 % (197.8 g)

Polymerisation 1 mol of TCC (mixture of isomers) and 1 mol of diamine (DA) are added, under nitrogen, to N-methylpyrrolidone such that a 20 % solution is formed. This solution is heated to 180° C. over 1 hour and kept, with stirring, for 10 hours at this temperature. After cooling, the polymer is precipitated by pouring the solution into water.

| | Amine component (DA) | Tg/°C. |
|---|---|---|
| (a) | bis(4-amino-3-methyl-5-ethylphenyl)methane | 302 |
| (b) | diaminodurol | 340 (Tm) |
| (c) | diaminononane | 105 |
| (c) | 1,3-bis(di-n-propylamine)-tetramethyl disiloxane | 82.4 |

Sulfation of the polyimides 0.1 mol of polyimide is dissolved in 100 ml of DMF and to the solution is added 0.12 mol of sulfur trioxide/-pyridine complex. After stirring for 5 hours, the reaction solution is cooled to room temperature and neutralised with 0.12 mol of tributylamine. The solution is poured into water to precipitate the polymer, which is isolated, washed copiously with water, and dried under vacuum.

| Example | polymer with DA | Tg/°C. |
|---|---|---|
| A12 | a | 290 |
| A13 | b | 328 (Tm) |
| A14 | c | 100 |
| A15 | d | 49.3 |

Tm melt temperature

B) Preparation of electrically conductive compositions

EXAMPLE B1

6 g of polymer according to Example A1 and 5 ml of pyrrole are dissolved in 200 ml of propylene carbonate. The solution is blanketed with nitrogen for 10 minutes and transferred to an electrolysis cell. At a current density of 2 mA/cm$^2$, a ca. 200 μm thick film deposits on to the anode over 2 hours. This film is removed from the electrode mechanically. extracted first with ethanol and then with acetonitrile, and dried under vacuum. The conductivity is 8.7 S/cm. The glass transition temperature (Tg) is 95° C. After drawing the film by 100 % at 95° C., the conductivity increases to 47.5 S/cm.

EXAMPLE B2

12 g of a copolymer according to Example A4 and 5 ml of pyrrole are dissolved in 200 ml of propylene carbonate and the solution is transferred to an electrolysis cell. In accordance with Example 7, a 290 μm thick film is obtained. The conductivity of the film is 0.75 s/cm. The Tg is 230° C.

EXAMPLE B3

6.4 g of a copolymer according to Example A5 are dissolved in 200 ml of propylene carbonate. The solution is blanked with nitrogen for 10 minutes and transferred to an electrolysis cell. In accordance with Example 7, a 218 pm thick film is obtained. The conductivity of the film is 8.07 S/cm. After drawing the film by ca. 30%, the conductivity increases to 16.5 S/cm. The glass transition temperature is 205° C.

EXAMPLE B4

23 g of partially sulfated polymer according to Example A2, 5.8 g of a mixture of phosphoric acid and tributylamine (pH=3.4), 12 ml of pyrrole and 4 ml of water are dissolved in 300 ml of propylene carbonate. The solution is saturated with nitrogen and transferred to an electrolysis cell fitted with a rotating Ni anode (A=30 cm$^2$) and a fine steel cathode. After 1 hour and 7 minutes, a 150 μm thick film is deposited at a current density of 2 mA/cm$^2$. After extraction with acetonitrile and vacuum drying, the yield is 353 g. The conductivity is 15.9 S/cm. The glass transition temperature is 110.5° C. By drawing at 100° C., the conductivity changes in the direction of drawing as follows:

| Drawing in % $l_c$ | Conductivity in S/cm |
|---|---|
| 0 | 15.9 |
| 20 | 25.3 |
| 40 | 29.4 |
| 85 | 33.1 |

EXAMPLE B5

18 g of polymer according to Example A1, 2 g of 2,2'-bithiophene, 2.1 g of a mixture of phosphoric acid and tetrabutylammonium hydroxide (pH=3.4) are dissolved in 300 ml of propylene carbonate and the solution is transferred, under nitrogen, to an electrolysis cell. After 1 hour, a 115 μm thick film deposits on to the Ni anode. The conductivity of the film is $5.5 \cdot 10^{-3}$ S/cm. The Tg is 107° C.

EXAMPLE B6

11.8 g of partially sulfated polybutadiene according to Example A7 are dissolved in 200 ml of propylene and, after addition of 10 ml of pyrrole, transferred to the already described electrolysis cell. At a current density of 2 mA/cm$^2$, a 0.088 cm thick film deposits over the course of 2 hours. The conductivity of the film is 12.5 S/cm. After drawing at room temperature by the factor of 2.11, the conductivity increases in the direction of drawing to 126 S/cm. The elongation at break of this film is ca. 211 %, the modulus of elasticity is 387 MPa. Analogous experiments with polybutadienes according to Examples A8 and A9 give films with conductivities (undrawn) in the range of 8-14 S/cm.

EXAMPLE B7

A solution of 5.77 g of the copolymer according to Example A11 and 10 ml of pyrrole in 200 ml of propylene carbonate is reacted electrochemically as described in Example B6. After an electrolysis time of 1 hour, a 0.012 pm thick film is obtained. The conductivity is 3.7 S/cm. The film can be shaped at temperatures of ca. 150° C.

EXAMPLE B8

A solution of 6.44 s of the copolymer according to Example A10 and 10 ml of pyrrole is reacted electrochemically as described in Example B6. After an electrolysis time of 1 hour, a 0.013 cm thick film is obtained. The conductivity is 4.6 S/cm. The film can be shaped at temperatures of ca. 150° C.

EXAMPLE B9

16.7 g of the sulfated polyimide according to Example A12 are dissolved in 200 ml of propylene carbonate and 10 ml of pyrrole are added to the solution. After an electrolysis time of 53 minutes (200 As, a 0.006 cm thick film is obtained in accordance with Example B6. The conductivity is 3.9 S/cm.

EXAMPLE B10

7.16 g of the sulfated polyimide according to claim A13 are dissolved in 200 ml of propylene carbonate (0.05 molar) and to the solution are added 10 ml of pyrrole. In accordance with Example B6, a 0.01 cm thick film with a conductivity of 0.32 S/cm is obtained at a charging density of 200 As.

EXAMPLE B11

7.66 of the sulfated polyimide according to Example A14 are dissolved in 200 ml of propylene carbonate (0.05 molar, and to the solution are added 10 ml of pyrrole. In accordance with Example B6, a 0.009 cm thick film with a conductivity of 0.7 S/cm is obtained at a charging density of 200 As.

EXAMPLE B12

8 g of the sulfated polyimide according to Example A15 are dissolved in 200 ml of propylene carbonate (0.05 molar) and to the solution are added 10 ml of pyrrole. In accordance with Example B6, a 0.0095 cm thick film with a conductivity of 8 S/cm is obtained at a charging density of 200 As.

What is claimed is:

1. [A] *An electrically conductive polymer* composition comprising

[(a)] at least one [oxidized] polycationic *polymer and at least one polyanionic polymer, wherein the polycationic polymer is prepared by electropolymerizing, in a solution with the polyanionic polymer, a monomer selected from the group consisting of aniline, a 3-$C_1$-$C_{12}$ alkyl-substituted aniline and a* polyheteroaromatic compound which has 5- or 6-membered rings containing 1-3 heteroatoms selected from the group consisting of —O—, —S— and —N—, which rings are either unsubstituted or substituted on the carbon atoms with $C_1$-$C_{16}$ alkyl [or at least one oxidized polycationic aniline or a 3-$C_1$-$C_{12}$ alkyl-substituted oxidized polycationic aniline]; and

[(b) at least one polyanion of] *the polyanionic polymer is* a film-forming thermoplastic polymer containing sulfated alcohol groups

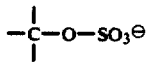

in repeating structural units, having a glass transition temperature of −100 to +350° C. and a tensile strength of 5 MPa to 1000 MPa, *the polyanionic polymer being selected from the group consisting of polyesters, polyester amides, polyurethanes, polyamides, polycarbonates, polyimides obtained from hydroxyl-containing monomers, saponified polymers of vinyl esters and ethers, hydroxylated polybutadiene, polyisoprene or polychloroprene, polyacrylates or polymethacrylates containing hydroxyl groups in the ester moiety, polysiloxanes containing hydroxyalkyl groups or reduced polyketones, polyadducts of glycidyl compounds containing on average more than one epoxy group with a diol, and copolymers thereof.*

2. A composition according claim 1, wherein the polyheteroaromatic compound is formed from 5- or 6-membered rings which contain 1 to 3 hetero atoms selected from the group consisting of O, S and N, and the carbon atoms of which are unsubstituted or substituted by $C_1$-$C_{16}$alkyl.

3. A composition according to claim 2, wherein the 5-6-membered ring is selected from the group consisting of pyrrole, thiophene, furan, 2,2'-bipyrrole, 2,2'-bithiophene, 2,2'-bifurane, thiazole, oxazole, thiadiazole and imidazole.

4. A composition according to claim 2, wherein the polyheteroaromatic compound is formed from a pyrrole of formula

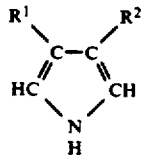

wherein $R^1$ and $R^2$ are each independently of the other hydrogen or $C_1$-$C_6$alkyl.

5. A composition according to claim 1, which contains 0.1 to 0.5 structural units containing sulfated alcohol groups

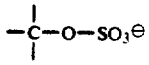

per structural unit of the polyheteroaromatic compound.

6. A composition according to claim 5, which contains 0.2 to 0.4 structural units containing sulfated alcohol groups.

7. A composition according to claim 1, wherein the thermoplastic polymer containing sulfated alcohol groups

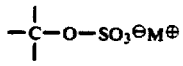

salt form has a Tg of −100 to +350° C., and M⊕ is an alkali metal cation or an ammonium cation.

8. A composition according to claim 7, wherein the Tg if −50° to +250° C.

9. A composition according to claim 1, wherein the ratio of free alcohol groups to sulfated alcohol group

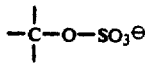

in the thermoplastic polymer is 50:1 to 1:50.

10. A composition according to claim 9, wherein the ratio is 10:1 to 1:10.

11. A composition according to claim 1, wherein the [thermoplastic] *polyanionic* polymer is an at least partially sulfated polyadduct of a) a glycidyl compound containing on average more than one epoxy group and b) a diol which contains

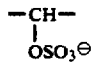

groups in the polymer chain.

12. A composition according to claim 11, wherein the polyadduct contains a) 100 to 5 mol % of identical or different structural units of formula I

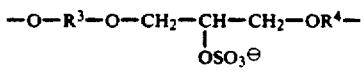

(I)

and b) 95 to 9 mol % of identical or different structural units of formula II

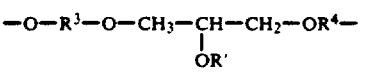

(II)

based on said polyadduct in which formulae (I) and (II) above $R^3$ and $R^4$ are each independently of the other the radical of a diol containing aliphatic or aromatic diol groups which radical is diminished by two hydroxyl groups, and R′ is hydrogen, $C_1$-$C_{20}$alkyl, $C_1$-$C_{20}$ acyl or aminocarbonyl which is substituted by a $C_1$-$C_{20}$hydrocarbon atom.

13. A composition according to claim 12. wherein $R^3$ and $R^4$ are each independently of the other a radical of formula III

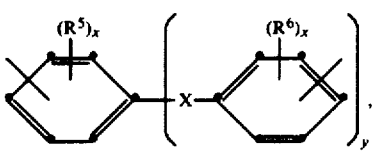

(III)

wherein X is a direct bond, $C_1$-$C_4$alkylene, $C_2$-$C_{12}$alkylidene, $C_5$-$C_8$cycloalkylidene, —O—, —S—, —SO—, $SO_2$—, —CO—, —$CO_2$, —N($C_1$-$C_4$alkyl) or —$Si(CH_3)_2$, $R^5$ and $R^6$ are each independently of the other hydrogen, halogen, $C_1$-$C_4$alkyl, or $C_1$-$C_4$alkoxy, and x is 1 or 2 and y is 0 or 1.

14. A composition according to claim 12, wherein $R^3$ and $R^4$ are the radical

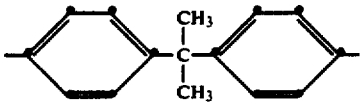

15. A composition according to claim 1, wherein the [thermoplastic] *polyanionic* polymer is an at least partially sulfated homopolymer or copolymer of acrylates or methacrylates containing a

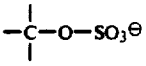

group in the ester moiety.

16. A composition according to claim 15, wherein the *polyanionic* polymer contains a) 100 to 5 mol % of identical or different structural units of formula IV

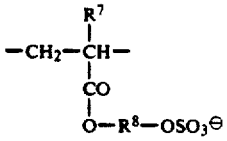

(IV)

and b) 95 to 0 mol % of identical or different structural units of formula V

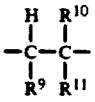

(V)

based on [said] *the polyanionic* polymer, in which formulae (IV) and (V) $R^7$ is hydrogen or methyl, $R^8$ is linear or branched $C_2$-$C_{18}$-alkylene, poly($C_2$-$C_6$oxaalkylene) containing 2 to 6 oxaalkylene units, $C_5$-$C_8$cycloalkylene, phenylene, benzylene or xylylene or is the group

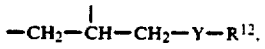

Y is —O—,

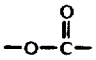

or —N($C_1$-$C_4$alkyl) and $R^{12}$ is $C_1$-$C_{18}$alkyl, $C_5$-$C_7$-cycloalkyl, ($C_1$-$C_{12}$alkyl)-$C_5$-$C_7$cycloalkyl, phenyl, ($C_1$-$C_{12}$alkyl)phenyl, benzyl or ($C_1$-$C_{12}$alkyl)benzyl, $R^9$ is hydrogen, $C_1$-$C_6$alkyl, —$COOR^{12}$ or —COO⊖, $R^{10}$ is hydrogen, fluoro, chloro, cyano or $C_1$-$C_6$alkyl, and $R^{11}$ is hydrogen, fluoro chloro, cyano, $R^{12}$ is —O—, $C_1$-$C_{12}$alkyl, —COO⊖, —$COOR^{12}$, —$COOR^8$—OH, —O-CO—$R^{12}$ or phenyl, where $R^9$ and $R^{12}$ have the given meanings.

17. A composition according to claim 16, wherein the polymer contains structural units of formula IV in which $R^7$ is hydrogen or $CH_3$, and $R^8$ is linear or branched $C_2$-$C_6$alkylene, cyclopentylene or cyclohexylene, and structural units of formula V wherein $R^9$ is hydrogen, $R^{10}$ is hydrogen or methyl, and $R^{11}$ is —$COOR^{12}$ or —$COOR^8$—OH.

*18. A composition as set forth in claim 1 wherein said polymer is a copolymer containing moieties which are residues of saponified vinyl esters or ethers, acrylates or methacrylates containing hydroxyl groups in the ester moiety, or hydroxylated butadiene, isoprene or chloroprene; wherein the monomer has been further copolymerized with a different comonomer selected from the group consisting of acrylonitrile, olefins, diolefins, vinyl chloride, vinylidene chloride, vinyl fluoride, vinylidene fluoride, styrene, α-methylstyrene, maleic anhydride, maleimide, vinyl ethers and vinyl esters.*

*19. A composition as set forth in claim 1 wherein the polyimide contains residues from hydrogenated ketotetracarboxylic acids.*

* * * * *